(12) United States Patent
Amsellem (10) Patent No.: US 9,551,186 B2
(45) Date of Patent: Jan. 24, 2017

(54) TURBINE SPEED CONTROL SYSTEM FOR DOWNHOLE TOOL

(71) Applicant: Schlumberger Technology Corporation, Sugar Land, TX (US)

(72) Inventor: Olivier Amsellem, Le Plessis Robinson (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 459 days.

(21) Appl. No.: 14/025,726

(22) Filed: Sep. 12, 2013

(65) Prior Publication Data

US 2014/0069724 A1 Mar. 13, 2014

(30) Foreign Application Priority Data

Sep. 13, 2012 (EP) .................... 12184313

(51) Int. Cl.
*E21B 4/02* (2006.01)
*E21B 41/00* (2006.01)
(Continued)

(52) U.S. Cl.
CPC .............. *E21B 4/02* (2013.01); *E21B 41/0085* (2013.01); *F16D 51/40* (2013.01); *F16D 57/02* (2013.01);
(Continued)

(58) Field of Classification Search
CPC ...... E21B 4/02; E21B 41/0085; F01D 21/006; F01D 21/02; F01D 21/14; F03B 11/00; F03B 13/02; F03B 15/00; F03B 15/04; F03B 15/06; F05D 2260/90; F05D 2260/9011; F05D 2260/904; F05D 2270/02; F05D 2270/021; F16D 57/00; F16D 57/005; F16D 57/007; F16D 57/02; F16D 59/00; F16D 51/40; F16D 2127/002; H02K 7/1283
See application file for complete search history.

(56) References Cited

U.S. PATENT DOCUMENTS 3,140,854 A * 7/1964 Boyd ..................... F03B 15/06
415/21
3,495,919 A * 2/1970 McLimore ........... F01D 21/006
188/185

(Continued)

FOREIGN PATENT DOCUMENTS

WO 99/37017 A1 7/1999
WO 2004/062081 A1 7/2004

OTHER PUBLICATIONS

EP Communication Rule 69 EPC issued in the related EP Application 12184313.0 dated Mar. 24, 2014 (2 pages).
(Continued)

*Primary Examiner* — Robert E Fuller
*Assistant Examiner* — Christopher Sebesta
(74) *Attorney, Agent, or Firm* — Cameron R. Sneddon (57) ABSTRACT

Systems, methods, and devices are provided to generate a stable supply of electrical power in a drill string. In one example, a downhole turbine generator includes a turbine, a speed governor, and an alternator. The turbine may transform hydraulic power of a first fluid medium into rotational power of a rotating shaft. The speed governor may reduce the rotational power of the rotating shaft in a variable amount that depends on the speed of the rotating shaft. Specifically, weighted arms may shear a second fluid medium more when the speed is higher and less when the speed is lower. The shearing of the second fluid medium may generate a countervailing torque on the rotating shaft to reduce the rotational power of the rotating shaft. The alter- (Continued)

nator then may produce a generally stable supply of electrical power from the rotational power of the rotating shaft.

16 Claims, 7 Drawing Sheets

(51) Int. Cl.
*H02K 7/18* (2006.01)
*F16D 51/40* (2006.01)
*F16D 57/02* (2006.01)
*F16D 127/00* (2012.01)

(52) U.S. Cl.
CPC ....... *H02K 7/1823* (2013.01); *F16D 2127/002* (2013.01)

(56) References Cited

U.S. PATENT DOCUMENTS

| | | | |
|---|---|---|---|
| 5,517,464 A * | 5/1996 | Lerner | E21B 41/0085 175/45 |
| 6,312,215 B1 * | 11/2001 | Walker | F01D 21/006 188/74 |
| 7,133,325 B2 | 11/2006 | Kotsonis et al. | |
| 2002/0121377 A1 | 9/2002 | Longbottom | |
| 2003/0000782 A1 * | 1/2003 | Smith | F16D 57/02 188/290 |
| 2006/0159548 A1 * | 7/2006 | Hocquet | F03B 11/00 415/122.1 |
| 2010/0018655 A1 | 1/2010 | Nakajima | |
| 2010/0071910 A1 | 3/2010 | Ellson et al. | |
| 2011/0139268 A1 | 6/2011 | Scallen | |
| 2012/0091732 A1 | 4/2012 | Fallet et al. | |
| 2012/0139250 A1 | 6/2012 | Inman et al. | |

OTHER PUBLICATIONS

Extended European Search Report issued in the related Ep Application 12184313.0 dated Apr. 25, 2013 (5 pages).

* cited by examiner

TURBINE SPEED CONTROL SYSTEM FOR DOWNHOLE TOOL

BACKGROUND

This disclosure relates to converting the hydraulic power of drilling fluid moving through a drill string into a stable supply of electrical power, despite changes in drilling fluid flow rate.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A drill bit attached to a long string of drill pipe, generally referred to as the drill string, may be used to drill a borehole for an oil and/or gas well. In addition to the drill bit, the drill string may also include a variety of downhole tools to measure or log properties of the surrounding rock formation or the conditions in the borehole. These tools often require power to operate. To generate this power, a turbine generator may convert hydraulic power of drilling fluid moving through the drill string.

Specifically, in the drilling process, drilling fluid is pumped down into the drill string to mechanically power the rotation of the drill bit and to help remove rock cuttings out of the borehole. The drilling fluid may pass over one or more turbines of a turbine generator to transform hydraulic power into rotational mechanical power. The rotational mechanical power may be transformed by an alternator into electrical power.

While the amount of electrical power provided by the turbine generator generally depends on the flow rate of the drilling fluid, the electrically powered tools of the drill string may operate within a range of possible input voltages and currents. Various systems have been developed to maintain the reliability of these electronic components as the flow rate of the drilling fluid changes. These systems, however, have many disadvantages. For example, a gearbox may transform the input rotation speed of a rotating shaft into a higher or lower rotation speed to enter the alternator of the turbine generator. Still, such a gearbox may require substantial maintenance and may increase the complexity of the downhole turbine generator system. Likewise, a fluid braking mechanism that is external to the turbine generator also has been developed. Such an external fluid braking mechanism may effectively prevent some excessive rotation speeds of the rotating shaft of the turbine generator. The external fluid braking mechanism may be dependent on characteristics of the drilling fluid, however, which may vary from drilling operation to drilling operation.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices to generate a stable supply of electrical power in a drill string. To provide one example, a downhole turbine generator that can generate a stable supply of electrical power in a drill string may include a turbine, a speed governor, and an alternator. The turbine may transform hydraulic power of a first fluid medium into rotational power of a rotating shaft. The speed governor may reduce the rotational power of the rotating shaft in a variable amount that depends on the speed of the rotating shaft. Specifically, weighted arms may shear a second fluid medium more when the speed is higher and less when the speed is lower. The shearing of the second fluid medium may generate a countervailing torque on the rotating shaft to reduce the rotational power of the rotating shaft. The alternator then may produce a generally stable supply of electrical power from the rotational power of the rotating shaft.

In another example, a rotational speed governor for a downhole turbine generator may include a housing containing a fluid medium, a rotatable shaft at least partially disposed within the housing, a first member attached to the rotatable shaft, and a first weighted arm coupled to the first member. The rotatable shaft may rotate along a first axis, the first member may extend radially from the rotatable shaft, and a first weighted arm may be at least partially rotatable around a second axis. The second axis may be parallel to the first axis and the second axis may be configured to revolve around the first axis when the rotatable shaft rotates. A rotation of the rotatable shaft may cause a centripetal force that causes the first weighted arm to at least partially rotate around the second axis, thereby extending into, and shearing, a volume of the fluid medium. The shearing of the fluid medium by the first weighted arm may result in a countervailing torque on the rotatable shaft, which may reduce a rotational power of the rotatable shaft to a greater degree when the rotation of the rotatable shaft is higher and that reduces a rotational power of the rotatable shaft to a lesser degree when the rotation of the rotatable shaft is lower.

A drill string according to an embodiment may include a downhole tool and a turbine generator. The downhole tool may measure a characteristic of the rock formation and the turbine generator may generate electrical power to power the downhole tool. The turbine generator may generate the electrical power by converting hydraulic power of drilling fluid pumped through the drill string into rotational mechanical power of a rotating shaft. The turbine generator also may maintain a speed of the rotating shaft within a range of acceptable speeds despite changes in a flow rate of the drilling fluid. Moreover, the speed of the rotating shaft may be maintained by causing a fluid medium other than the drilling fluid to shear and produce a countervailing torque on the rotating shaft that is higher when the speed of the rotating shaft is higher and that is lower when the speed of the rotating shaft is lower. The rotational mechanical power of the rotating shaft then may be converted into a generally stable supply of electrical power.

In another embodiment, a method may involve pumping drilling fluid into a drill string, thereby supplying hydraulic power to a turbine generator of the drill string. A speed governor wholly internal to the turbine generator may cause the turbine generator to generate electrical power within a range of acceptable output voltages and/or currents despite changes in drilling fluid flow rate that would, without the speed governor, cause the turbine generator to generate output voltages and/or currents outside the acceptable range. The method also may involve operating a downhole tool of the drill string using the electrical power generated by the turbine generator.

Various refinements of the features noted above may exist in relation to various aspects of this disclosure. Further features may also be incorporated in these various aspects as well. These refinements and additional features may exist individually or in any combination. For instance, various features discussed below in relation to one or more of the illustrated embodiments may be incorporated into any of the above-described aspects of this disclosure alone or in any combination. The brief summary presented above is intended only to familiarize the reader with certain aspects and contexts of embodiments of this disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, this disclosure relates to generating electrical power for downhole tools in a drill string. Specifically, drilling a borehole for an oil and/or gas well often involves a drill string—several drill pipes and a drill bit, among other things—that grinds into a rock formation when drilling fluid is pumped through the drill string. In addition to the drill bit, the drill string may also include several electrically powered tools. The tools in the drill string may include, for example, logging-while-drilling (LWD) tools, measurement-while-drilling (MWD) tools, steering tools, and/or tools to communicate with drilling operators at the surface.

In general, the borehole may be drilled by pumping drilling fluid into the tool string, causing the drill bit to rotate and grind away rock as the drilling fluid passes through. The hydraulic power of the drilling fluid may also be used to generate electricity. Specifically, a turbine generator may convert some of the hydraulic power of the drilling fluid into electrical power. To maintain a stable range of output voltages and/or currents, a rotor speed governor internal to the turbine generator may hold the rotation speed of the rotor to within an acceptable range, even while the flow rate of the drilling fluid may vary. Thus, despite such variations in the flow rate of the drilling fluid, the output voltages and/or currents of the turbine generator may remain relatively stable.

Figure 1:
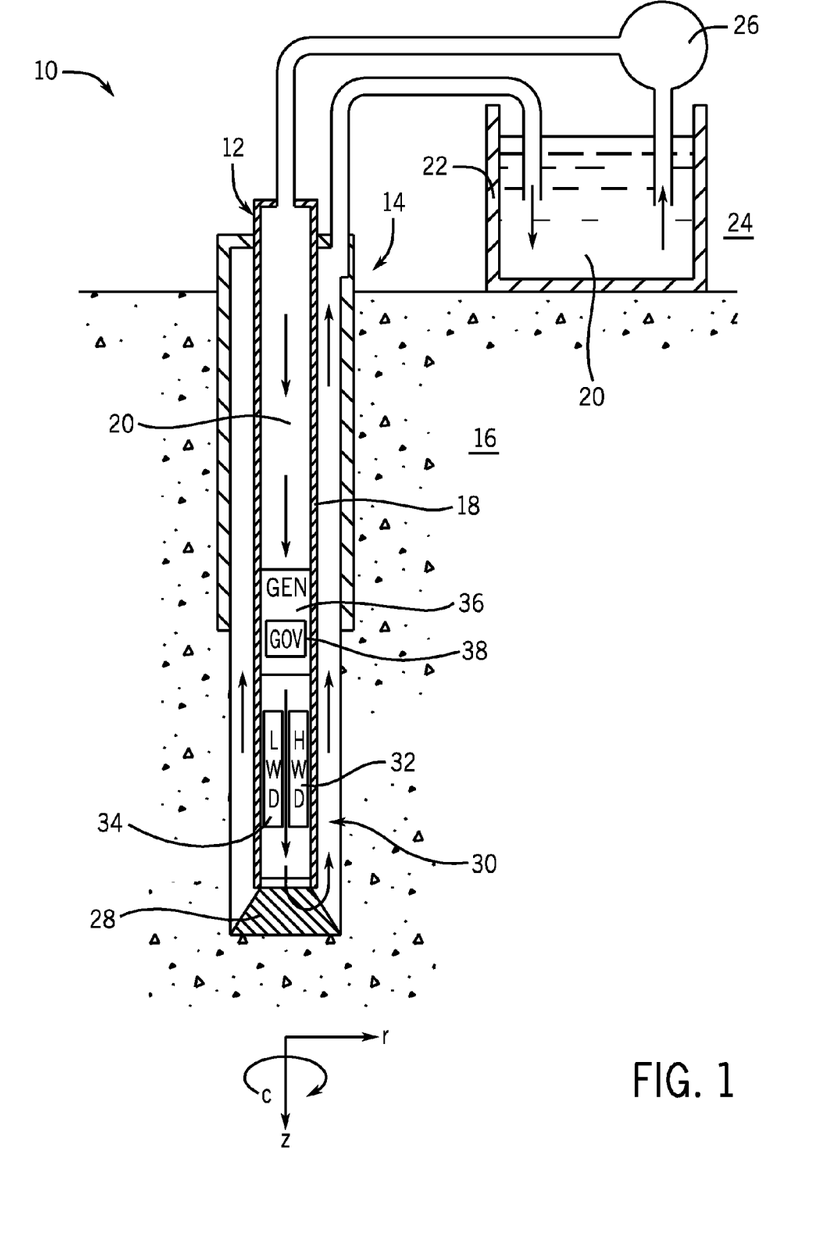
FIG. 1 is a schematic diagram of a drilling system that employs a turbine generator having a rotor speed governor to generate a stable supply of electrical power, in accordance with an embodiment.

A drilling system 10, shown in FIG. 1, may benefit from the stable electrical power generation mentioned above. The drilling system 10 of FIG. 1 includes a drill string 12 used to drill a borehole 14 into a rock formation 16. A drill collar 18 of the drill string 12 encloses the various components of the drill string 12. Drilling fluid 20 from a reservoir 22 at the surface 24 may be driven into the drill string 12 by a pump 26. The hydraulic power of the drilling fluid 20 causes a drill bit 28 to rotate, cutting into the rock formation 16. The cuttings from the rock formation 16 and the returning drilling fluid 20 exit the drill string 12 through a space 30. The drilling fluid 20 thereafter may be recycled and pumped, once again, into the drill string 12.

A variety of information relating to the rock formation 16 and/or the state of drilling of the borehole 14 may be gathered while the drill string 12 drills the borehole 14. For instance, a measurement-while-drilling (MWD) tool 32 may measure certain drilling parameters, such as the temperature, pressure, orientation of the drilling tool, and so forth. Likewise, a logging-while-drilling (LWD) tool 34 may measure the physical properties of the rock formation 16, such as density, porosity, resistivity, and so forth.

These tools and others may rely on electrical power for their operation. As such, a turbine generator 36 may generate electrical power from the hydraulic power of the drilling fluid 20. A rotor speed governor 38 may prevent excessive rotation of a rotor of the turbine generator 36. As a result, the turbine generator 36 may provide a generally stable supply of electrical power despite changes in the flow rate of the drilling fluid 20.

As seen in FIG. 1, the drill string 12 is generally aligned along a longitudinal z-axis. Components of the drill string 12 may be located within the drill string at various radial distances from the z-axis, as illustrated by a radial r-axis. Certain components, such as the turbine generator 36 may include parts that rotate circumferentially along a circumferential c-axis. The coordinate system shown in FIG. 1 will be used throughout the various drawings discussed below to represent the spatial relationship between various system components.

Figure 2:
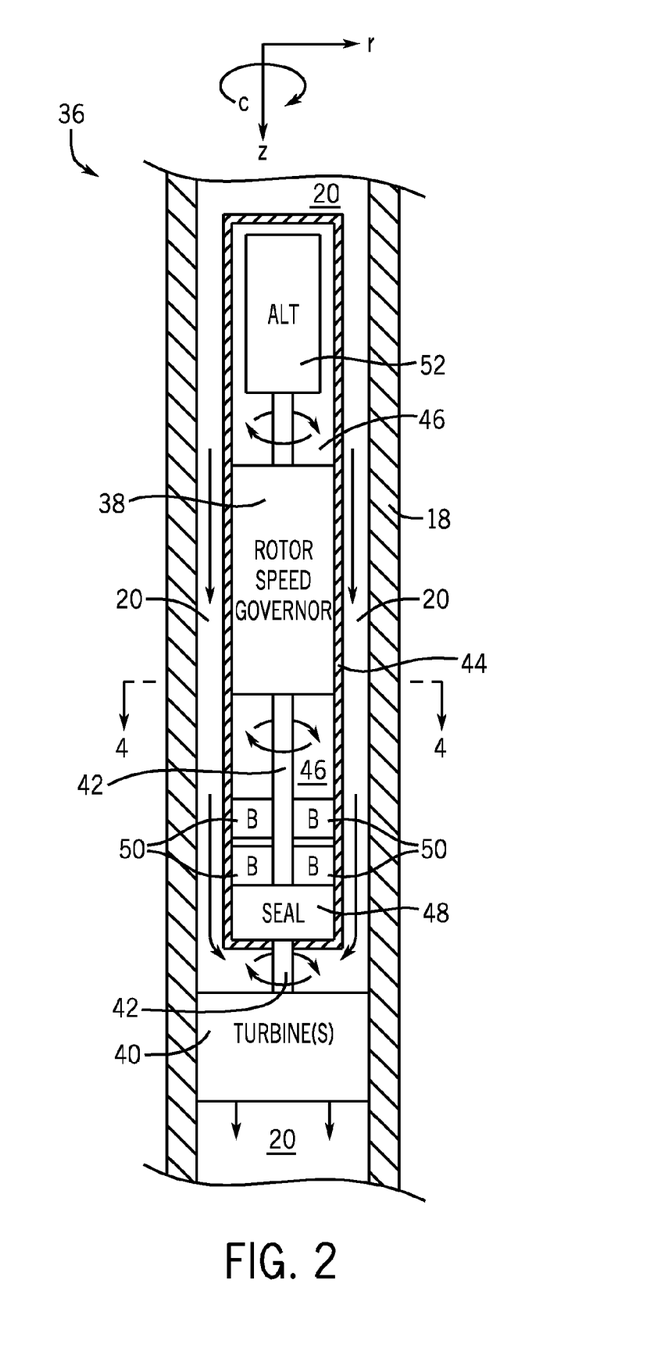
FIG. 2 is a schematic block diagram of a segment of a drill string containing the turbine generator and rotor speed governor, in accordance with an embodiment.

One configuration of the turbine generator 36 of the drill string 12 is shown as a block diagram in FIG. 2. As seen in FIG. 2, the turbine generator 36 includes several components, all found within the drill collar 18. Turbine(s) 40 convert the hydraulic power of the drilling fluid 20 moving through the drill string 22 into mechanical rotational power in a rotating shaft 42. The rotating shaft 42 may rotate along the z-axis in the same circumferential direction of the c-axis. In other embodiments, however, the turbine(s) 40 may cause the rotating axis 42 to rotate in the opposite direction. The rotating shaft 42, which may also be referred to as a rotor, provides the mechanical power that will be used to generate electrical power.

A generator housing 44 containing a lubricant 46 may receive the rotating shaft 42 through a seal 48. The seal 48, also referred to as a face seal, may prevent drilling fluid 20 from entering the generator housing 44 and may prevent the lubricant 46 from exiting. The seal 48 and housing 44 thus prevent the lubricant 46 from comingling with the drilling fluid 20, and vice versa. As will be discussed below, the lubricant 46 may represent any suitable machine lubricant. The viscosity of the lubricant 46 may be selected at least in part depending on the desired operation of the rotor speed governor 38, as will be discussed in greater detail below. The lubricant 46 may be, for example, an ester based lubricant.

After passing through the seal 48 (or transferring the rotational power to another shaft), bearings 50 may support the rotating shaft 42. The rotor speed governor 38 may prevent the rotating shaft 42 from reaching excessive speeds despite variations in the flow rate of the drilling fluid 20. The rotation of the rotating shaft 42 may cause an alternator 52 to generate electrical power. Because the speed of the rotating shaft 42 may be relatively stable, owing to the rotor speed governor 38, the electrical power generated by the alternator 52 may remain stable despite changes in the flow rate of the drilling fluid 20. In the example of FIG. 2, the turbine generator 36 does not include a gearbox. Indeed, the rotor speed governor 38 may obviate the need for a gearbox in the turbine generator 36. This may reduce both the mechanical complexity of the turbine generator 36 and may reduce corresponding maintenance costs. In addition, the rotor speed governor 38 may more effectively decrease the maximum speed of the rotating shaft 42 of the turbine generator 36. By reducing the maximum speed of the rotating shaft 42, the rotor speed governor 38 may reduce mechanical stresses on the turbine generator 36, extending its useful life. In some designs, the rotor speed governor 38 may also decrease the total size of the turbine generator 38. Even so, other embodiments of the turbine generator 36 may include a gearbox in addition to the rotor speed generator 36.

Figure 3:
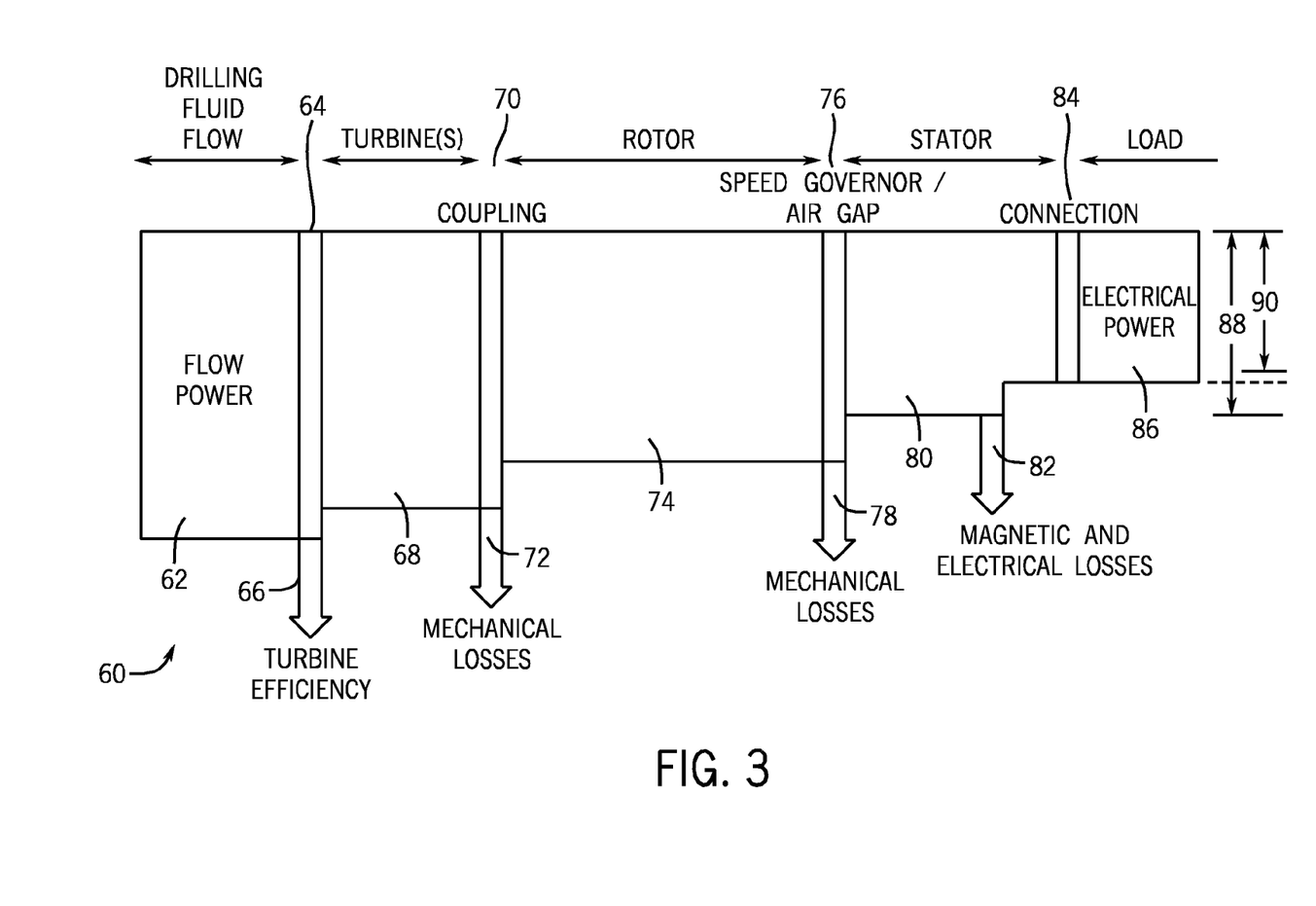
FIG. 3 is a power conversion diagram illustrating the conversion of hydraulic power from drilling fluid into electrical power using the turbine generator of FIG. 2, in accordance with an embodiment.

One explanation of the power conversion from hydraulic power to electrical power appears in a power conversion diagram 60 of FIG. 3. In particular, the flow of the drilling fluid 20 may provide some maximum amount of hydraulic power 62. This maximum amount of hydraulic power will be dissipated during the conversion from hydraulic power to mechanical power at an interface 64 between the drilling fluid 20 and the turbine(s) 40. The resulting power losses 66 may occur owing to inefficiencies of the turbine(s) 40. A resulting mechanical power 68 obtained the turbine(s) 40 is transferred to the rotating shaft 42, though also not without some inefficiencies. At this interface 70 between the turbine (s) 40 and the rotating shaft 42, additional mechanical power losses 72 may further reduce the total amount of rotational power 74 conferred to the rotating shaft 42.

Not all of the rotor power 74 may be used to generate electricity. Indeed, the rotor power 74 may be reduced, as shown at numeral 76, by inefficiencies of the alternator 52 as well as the rotor speed governor 38. For example, an air gap between the rotating shaft 42 at the alternator 52 and a stator of the alternator 52 may produce some power losses 78. In addition, however, a dynamic amount of power also may be dissipated by the rotor speed governor 38, as the rotor speed governor 38 generally maintains the speed of the rotating shaft 42. As will be discussed below, the rotor speed governor 38 may dissipate the excess power as heat.

The alternator 52 thus may produce a substantially constant amount of electrical power 80. It may be noted that some of the electrical power 80 will be lost through magnetic and electrical power losses 82, before being provided through a connection 84 to the electrically powered downhole tools. The resulting amount of electrical power output by the turbine generator 36 is shown as electrical power 86. Because the rotor speed governor 38 causes a variable amount of power losses 78 to keep the speed of the rotating shaft 42 relatively stable, the resultant output electrical power 86 may also be relatively stable. Indeed, in the example shown in FIG. 3, the output electrical power 86 may remain between a maximum acceptable output power 88 and a minimum acceptable output power 90 despite variations in the flow rate of the drilling fluid 20. Without the rotor speed governor 38, the same variations in the flow rate of the drilling fluid 20 might produce output electrical power 86 significantly above or below these thresholds.

The rotor speed governor 38 may keep the speed of the rotating shaft 42 relatively stable by introducing an increasing amount of shearing of the lubricant 46—and therefore an increasing torque against the rotating shaft 42—as the speed of the rotating shaft 42 increases. As generally discussed above with reference to FIG. 2, the rotor speed governor 38 may be fully encased within the housing 44 of the turbine generator 36. The rotor speed governor 38 thus may operate in a predictable manner. That is, the rotor speed governor 38 may not operate as a fluid brake through the drilling fluid 20, which may have characteristics that vary from drilling operation to drilling operation, but rather may operate based on the properties of the lubricant 46 and other components whose characteristics are known. Indeed, the rotor speed governor 38 may reduce the rotation speed of the rotating shaft 42 by creating a variable amount of shearing of the lubricant 46, which may produce a countervailing torque on the rotating shaft 42. An example of how the rotor speed governor 38 may keep the speed of the rotating shaft 42 relatively stable appears in FIGS. 4A-C.

Figure 4A:
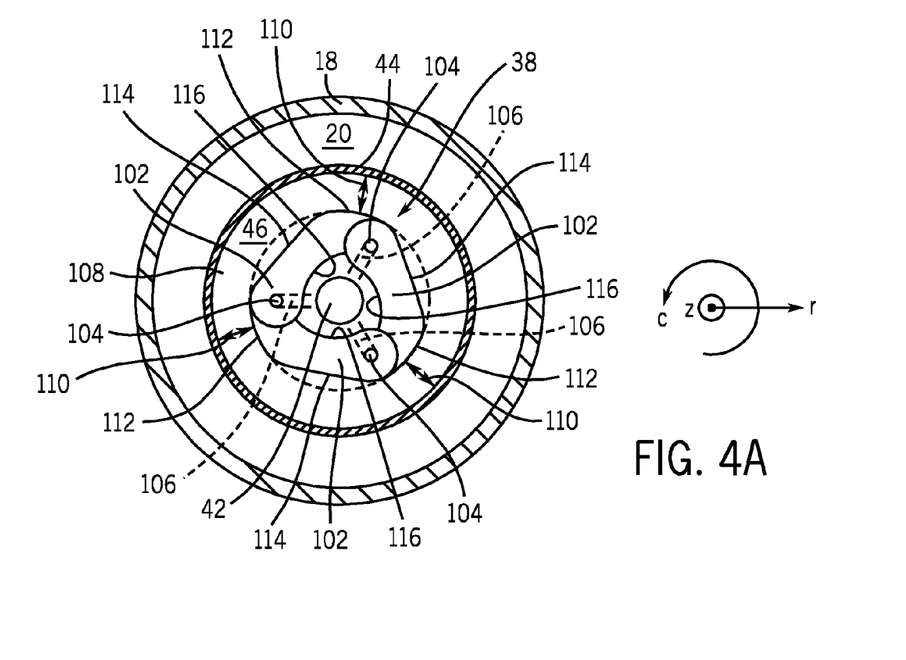
FIGS. 4A-C are cross-sectional views of one example of the rotor speed governor of FIG. 2, respectively illustrating different stages of operation as the drilling fluid flow rate increases, in accordance with an embodiment.
Figure 4B:
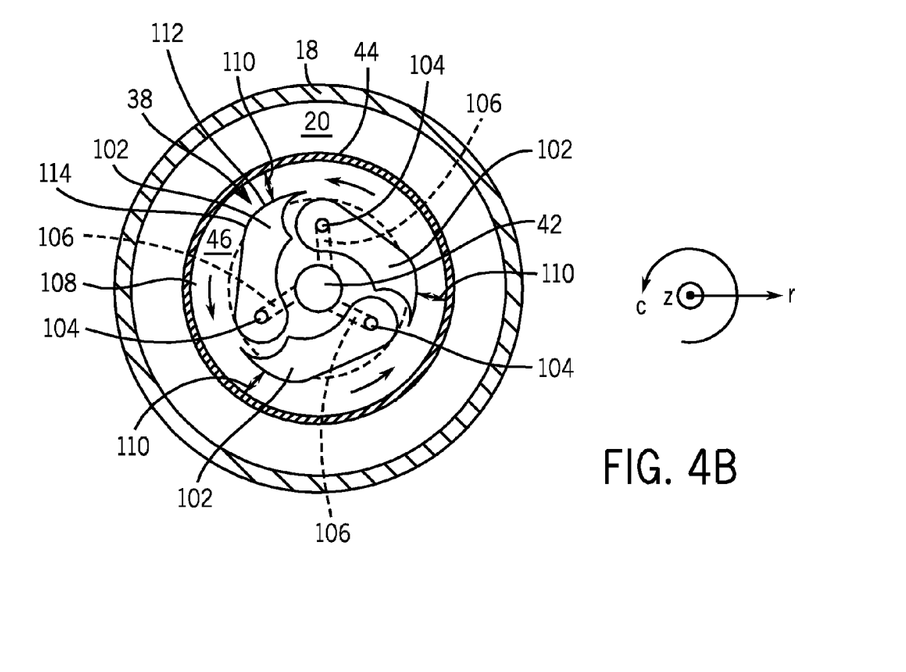
Figure 4C:
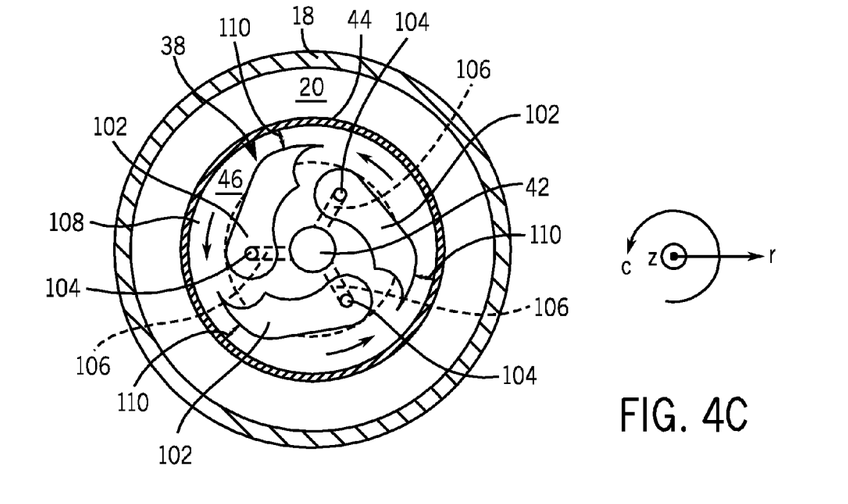

FIGS. 4A-C represent cross-sectional views of one example of the rotor speed governor 38 at different rotation speeds of the rotating shaft 42. The cross-sectional views of FIGS. 4A-C may be understood to be cross-sectional views of the rotor speed governor shown in FIG. 2 at cut lines 4-4. Specifically, FIG. 4A illustrates the rotor speed governor 38 when the rotating shaft 42 is either at rest or rotating relatively slowly, FIG. 4B illustrates the rotor speed governor 38 when the rotating shaft 42 is rotating at a moderately higher speed, and FIG. 4C illustrates the rotor speed governor 38 when the rotating shaft 42 is rotating at an even higher speed.

As shown in FIGS. 4A-C, the rotor speed governor 38 may be centered within the drill collar 18. Drilling fluid 20 may fill the space between the drill collar 18 and the generator housing 44. In the example of FIGS. 4A-C, the drilling fluid 20 is flowing in the z-direction toward the viewer. Disposed around the rotating shaft 42 are a number of weighted arms 102. Each of the weighted arms 102 is rotatably attached at a joint 104 on a respective member 106, and may rotate around the joint 104 on an axis parallel to the z-axis. The shape of the weighted arms 102 may be selected to result in a proper amount of lubricant 46 shearing so as to generally maintain the rotation speed of the rotating shaft 42 despite changes in the flow rate of the drilling fluid 20. The shape of the weighted arms 102 may be determined experimentally or through computer modeling. In the example of FIGS. 4A-C, the weighted arms 102 include portions that extend radially from the joint 104 farther on one side than the other. It is this unbalanced aspect of the weighted arms 102 that allows the weighted arms 102 to respond to centripetal forces by extending outward, away from the rotating shaft 42, as will be discussed further below. The members 106 may be attached to, or formed as a part of, the rotating shaft 42. The members 106 may extend in a generally radial direction from the rotating shaft 42.

As mentioned above, the rotating shaft 42 may rotate in the c-axis direction. In the example of FIGS. 4A-C the rotating shaft 42 rotates in a counterclockwise direction. The weighted arms 102 may take the configuration shown in FIG. 4A when the rotating shaft 42 is rotating relatively slowly. That is, the weighted arms 102 generally may not extend outward away from the rotating shaft 42 while the rotating shaft 42 is at rest or relatively low speeds. The weighted arms 102 may not extend despite mild centripetal forces away from the rotating shaft 42, owing to a spring (not visible in FIGS. 4A-C) that applies a torque to the weighted arms 102 around the joint 104 or to the pressure of the lubricant 46 against the weighted arms 102.

For reasons discussed below, an outer portion of the space within the housing 44 may be referred to as a lubricant shearing zone 108. A distance 110 into which the weighted arms 102 extend into the lubricant shearing zone 108 may represent a degree to which the shearing of the lubricant 46 generates a countervailing torque against the rotating shaft 42, dissipating some of the rotational power of the rotating shaft 42 as waste heat. The shearing of the lubricant 46 may occur as pressure by the lubricant 46 builds on outer faces 112 and/or 114 of the weighted arms 102. By contrast, the pressure of the lubricant 46 will generally be lower on an inner face 116 of the weighted arms 102, even as the weighted arms 102 extend farther into the lubricant shearing zone 108. This difference in the pressure of the lubricant 46 on the outer faces 112 and 114 and inner faces 116 of the weighted arms may occur because the weighted arms 102 revolve, with the members 106 to which they are attached, in a counterclockwise direction around the rotating shaft. That is, the lubricant 46 does not slow the rotation of the rotating shaft 46 by putting pressure on the inner faces 116 of the weighted arms, but rather on the outer faces 112 and 114.

Indeed, as shown in FIG. 4B, as the rotating shaft 42 increases its rotation, inertial centripetal forces on the weighted arms 102 may draw the weighted arms 102 farther into the lubricant shearing zone 108. The distance 110 thus may be smaller, and the greater the resistance and/or pressure locally applied to the faces 112 and 114 due to lubricant 46 shearing in the lubricant shearing zone 108. Finally, as shown in FIG. 4C, when the rotating shaft 42 reaches an even higher speed, the centripetal forces on the weighted arms 102 may be even greater. Thus, the distance 110 may grow even smaller as the weighted arms 102 extend even farther into the lubricant shearing zone 108. The greater the amount of shearing that occurs, the greater the countervailing torque applied to the rotating shaft 42, the greater the amount of rotational power that is dissipated, and the greater the amount of heat generated.

Here, it may be noted that this waste heat may not build up in the lubricant 46, but rather may be dissipated through the housing 44 into the drilling fluid 20 and away. Thus, the housing 44 around the rotor speed governor 38 may be formed from a suitably heat-transmissive material, such as a copper-beryllium based alloy or other metal, to facilitate heat transfer from the lubricant 46 into the drilling fluid 20. Because the drilling fluid 20 will be flowing past the rotor speed governor 38 at a fast enough rate, excessive heat may neither build up in the drilling fluid 20 nor the lubricant 46. In effect, the drilling fluid 20 may act as a cold source to deposit the waste heat produced by the lubricant 46 shearing.

Figure 5:
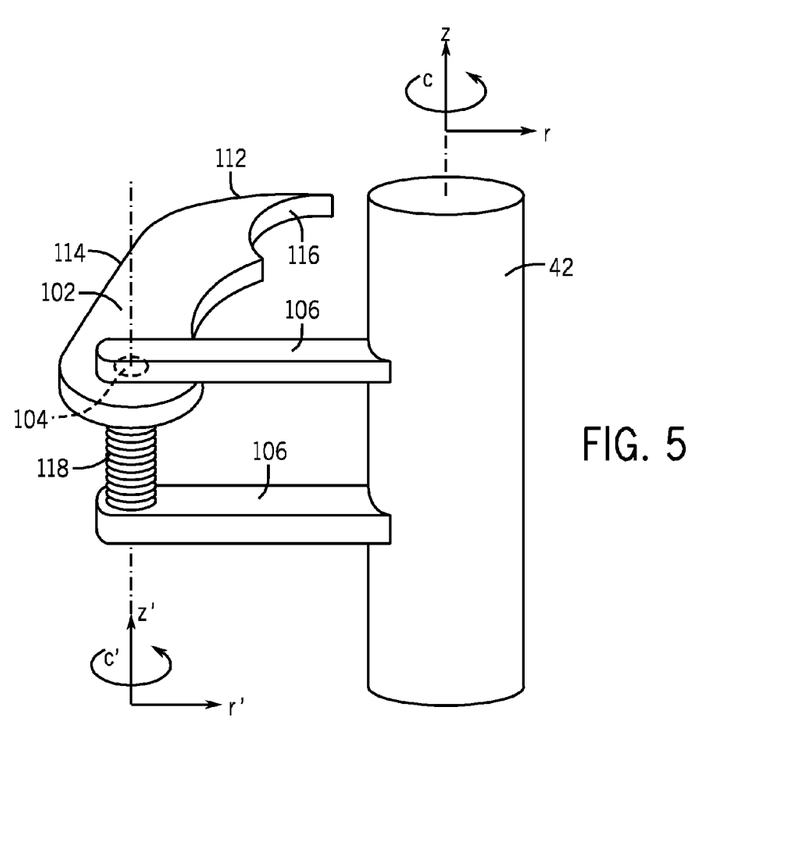
FIG. 5 is a perspective view of a rotating weighted arm used by the rotor speed governor to prevent excessive rotor speeds, in accordance with an embodiment.

One example of a perspective view of one of the weighted arms 102 and the rotating shaft 42 of the rotor speed governor 38 appears in FIG. 5. As seen in FIG. 5, the rotating shaft 42 is aligned with the z-axis. As discussed above, the rotating shaft 42 may rotate in a circumferential direction along the c-axis, or counterclockwise around the z-axis. The member 106 may attach to the weighted arm 102 through two separate extending components of the member 106. A torsion spring 118 between one of the components of the member 106 and the weighted arm 102 may draw the weighted arm 102 toward the rotating shaft 42. The precise strength of the torsion spring 118 may be selected based on experimental or computer modeling data to prevent the weighted arms 102 from extending too far into the lubricant shearing zone 108 too soon. In some embodiments, the torsion spring 118 may not be present. Instead, the pressure of the lubricant 46 and the shape of the weighted arms 102 may keep the weighted arms 102 from causing excessive lubricant 46 shearing.

As can be seen in FIG. 5, the joint 104 of the weighted arm 102 acts as a second axis z' in a coordinate system z', r', and c'. The z' axis of this second coordinate system z', r', and c' may revolves around the axis z of the first coordinate system z, r, and c, with the rotation of the rotating shaft 42. As the rotation of the rotating shaft 42 increases, the centripetal forces cause the weighted arm 102 to move along the c' axis around the z' axis, thereby extending farther away from the rotating shaft 42.

Figure 6:
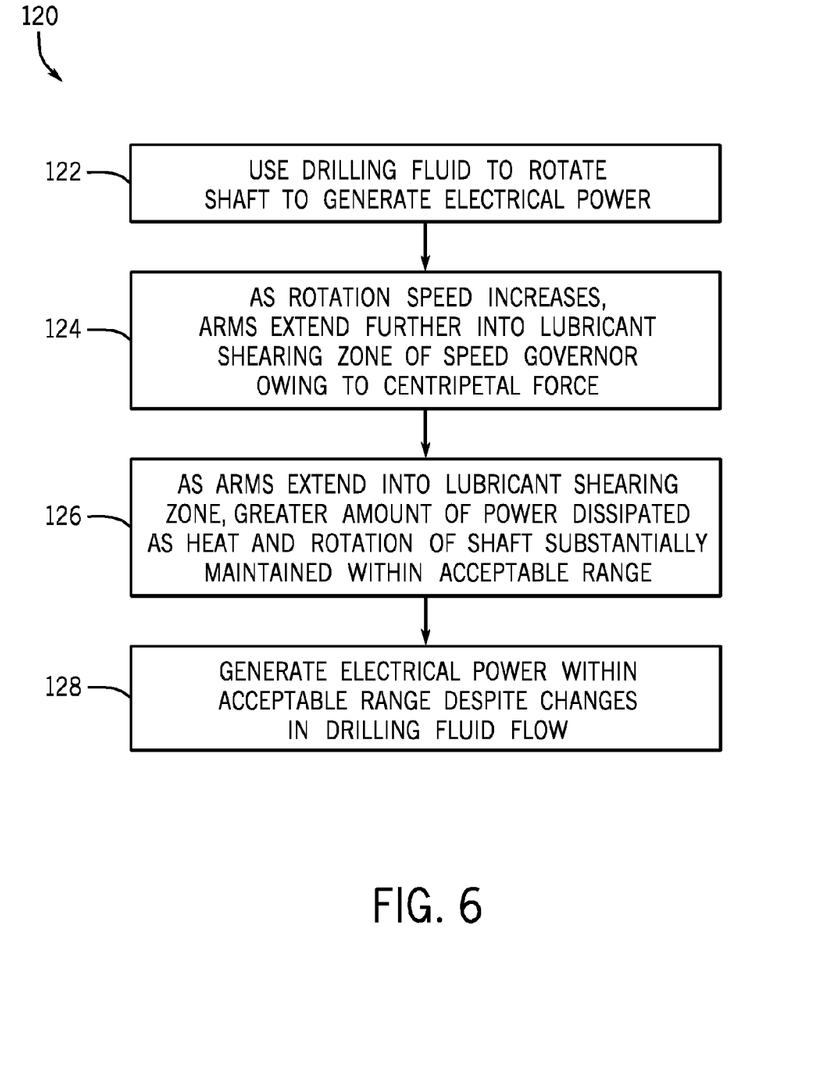
FIG. 6 is a flowchart of a method for operating the turbine generator in the drill string, in accordance with an embodiment.

To summarize, as shown by a flowchart 120 of FIG. 6, the drilling fluid 20 may be pumped into the drill string 12 to cause the turbine(s) 40 to rotate, thereby generating electrical power (block 122). As mentioned above, however, the flow rate of the drilling fluid 20 may change. When the flow rate of the drilling fluid 20 increases, thereby causing the rotation of the rotating shaft 42 to increase, the weighted arms 102 may extend farther into the lubricant shearing zone 108 as a result of inertial centripetal forces acting on the weighted arms 102 (block 124). The shearing of the lubricant 46 in the lubricant shearing zone 108 results in a countervailing torque on the rotating shaft 42. In addition, the shearing of the lubricant 46 may cause the increased rotational power of the rotating shaft 42 to be dissipated as heat and the rotation of the rotating shaft 42 may remain substantially within an acceptable range of rotating speeds (block 126). Because the range of rotating speeds of the rotating shaft 42 will be limited, the turbine generator 36 may generate electrical power within an acceptable range despite changes in the flow rate of the drilling fluid 20 (block 128).

Figure 7A:
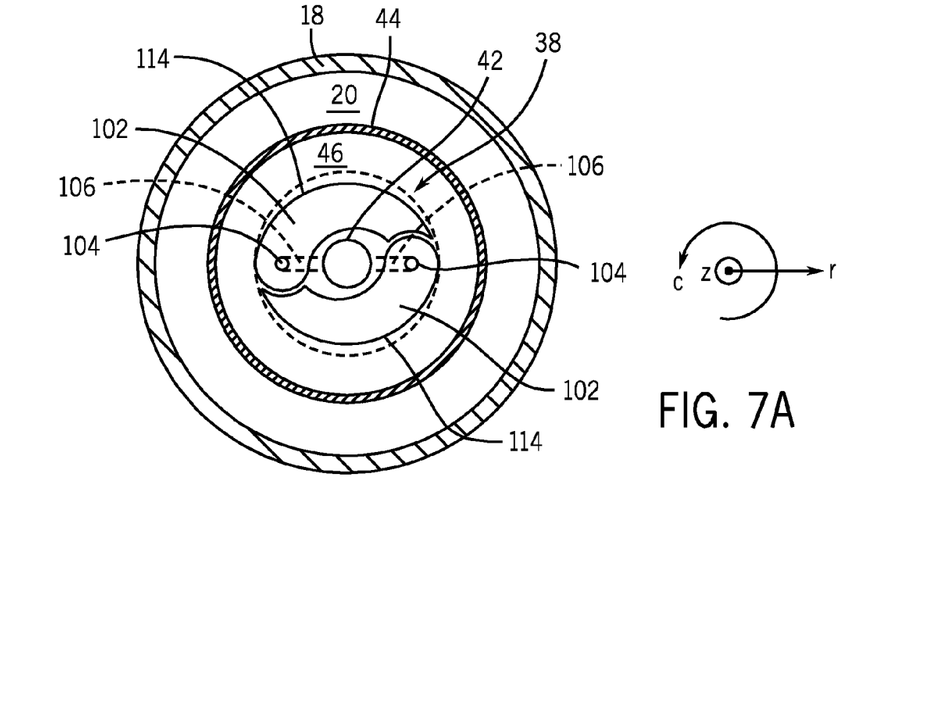
FIGS. 7A and 7B are cross-sectional views of another example of the rotor speed governor of FIG. 2, in accordance with an embodiment.
Figure 7B:
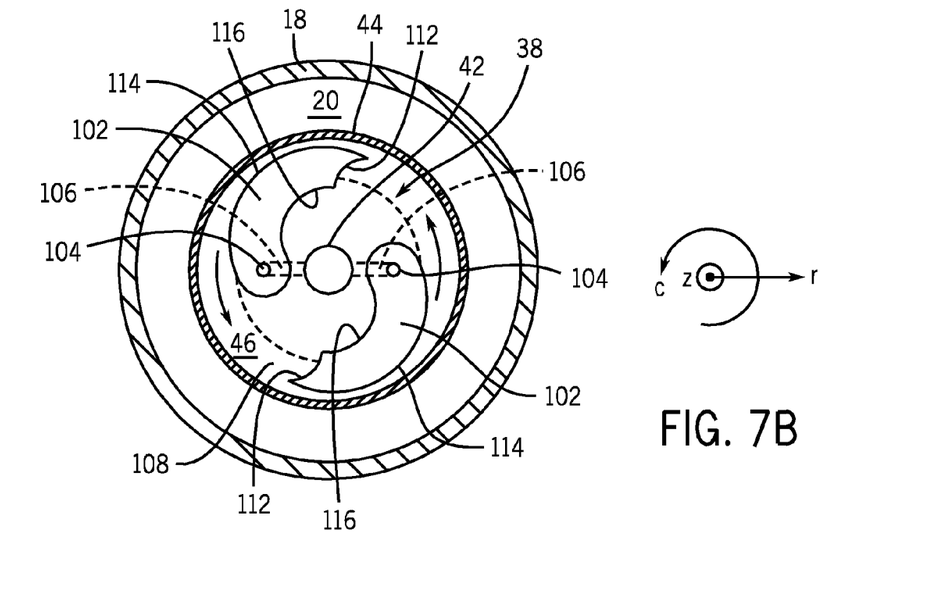

In general, any suitable configuration of the weighted arms 102, including number, size, shape, and weight, may be employed, provided the rotation speed of the rotating shaft 42 is constrained. Indeed, the example of FIGS. 4A-C and FIG. 5 represent only one example. Another example is presented in FIGS. 7A-B. In this second example, the rotor speed governor 38 may include only two weighted arms 102. The two weighted arms 102 may generally have rounded outer faces 114. However, it should be appreciated that any suitable number of weighted arms 102 may be chosen and selected. As can be seen in FIG. 7A, when the rotation of the rotating shaft 42 is sufficiently low, the weighted arms 102 generally may not extend into the lubricant shearing zone 108. As the rotation of the rotating shaft 42 increases, however, the weighted arms 102 may extend farther into the lubricant shearing zone 108, thereby producing a greater amount of shearing on the lubricant 46. As a result, the increased shearing of the lubricant 46 produces a stronger countervailing torque against rotating shaft 42, which suppresses excessive speeds of rotation of the rotating shaft 42.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A downhole turbine generator comprising:
a turbine to transform hydraulic power of a first fluid medium passing through the turbine into rotational power of a rotating shaft
a speed governor to reduce the rotational power of the rotating shaft by a variable amount depending on a speed of the rotating shaft, wherein the speed governor comprises weighted arms that shear a second fluid medium to a greater degree when the speed of the rotating shaft is higher and shear the second fluid medium to a lesser degree when the speed of the rotating shaft is lower, wherein the shearing of the second fluid medium generates a countervailing torque on the rotating shaft that reduces the rotational power of the rotating shaft; and
an alternator configured to produce electrical power from the rotational power of the rotating shaft,
wherein at least a part of each weighted arm of the speed governor is configured to shear the second fluid medium by extending farther away from the rotating shaft and further into the second fluid medium when the speed of the rotating shaft is higher.

2. The downhole turbine generator of claim 1, wherein the first fluid medium comprises drilling fluid.

3. The downhole turbine generator of claim 1, wherein each weighted arm of the speed governor comprises a rotatable member that rotates around a respective arm axis, wherein a center of mass of each rotatable member is configured to move away from the rotating shaft owing at least in part to a centripetal force exerted by the rotating shaft and wherein the center of mass of each rotatable member is configured to move toward the rotating shaft owing at least in part to the shearing of the second fluid medium.

4. The downhole turbine generator of claim 1, wherein each weighted arm of the speed governor comprises a rotatable member that rotates around a respective arm axis, wherein a center of mass of each rotatable member is configured to move away from the rotating shaft owing at least in part to a centripetal force exerted by the rotating shaft and wherein the center of mass of each rotatable member is configured to move toward the rotating shaft owing at least in part to a torsion device that provides a torque around the respective arm axis.

5. The downhole turbine generator of claim 1, wherein the speed governor comprises at least two weighted arms.

6. The downhole turbine generator of claim 1, wherein the speed governor comprises at least three weighted arms.

7. The downhole turbine generator of claim 1, comprising a housing that contains the second fluid medium and at least the speed governor, wherein the housing separates the speed governor and the second fluid medium from the first fluid medium.

8. The downhole turbine generator of claim 7, wherein the housing is configured to permit heat transfer from the second fluid medium to the first fluid medium to dissipate heat generated by the shearing of the second fluid medium.

9. A rotational speed governor for a downhole turbine generator, the rotational speed governor comprising:
a housing containing a fluid medium;
a rotatable shaft at least partially disposed within the housing, wherein the rotatable shaft is configured to rotate along a first axis;
a first member attached to the rotatable shaft, wherein the first member extends radially from the rotatable shaft;
a first weighted arm coupled to the first member, wherein the first weighted arm is configured to be at least partially rotatable around a second axis, wherein the second axis is parallel to the first axis and the second axis is configured to revolve around the first axis when the rotatable shaft rotates;
wherein a rotation of the rotatable shaft is configured to cause a centripetal force that causes the first weighted arm to at least partially rotate around the second axis, thereby extending into, and shearing, a volume of the fluid medium, wherein the shearing of the fluid medium by the first weighted arm results in a countervailing torque on the rotatable shaft that reduces a rotational power of the rotatable shaft to a greater degree when the rotation of the rotatable shaft is higher and that reduces a rotational power of the rotatable shaft to a lesser degree when the rotation of the rotatable shaft is lower.

10. The speed governor of claim 9, comprising:
a second member substantially identical to the first member, wherein the second member is attached to the opposite side of the rotatable shaft from the first member; and
a second weighted arm substantially identical to the first weighted arm, wherein the second weighted arm is coupled to the second member and configured to operate in substantially the same way as the first weighted arm.

11. The speed governor of claim 9, comprising:
at least two additional members substantially identical to the first member, wherein the at least two additional members are attached to the rotatable shaft along a plane perpendicular to the first axis, wherein the first member and the at least two additional members are attached to the rotatable shaft approximately equal distances apart from one another; and
at least two weighted arms substantially identical to the first weighted arm, wherein the at least two weighted arms are respectively coupled to the at least two additional members and are configured to operate in substantially the same way as the first weighted arm.

12. The speed governor of claim 9, comprising a torsion spring attached to the first member and the first weighted arm, wherein the torsion spring is configured to apply a torque that at least partially counteracts the centripetal force on the first weighted arm.

13. The speed governor of claim 9, wherein the first weighted arm is unequally balanced around the second axis.

14. A drill string used for drilling a borehole through a rock formation, the drill string comprising:
   a downhole tool configured to measure a characteristic of the rock formation; and
   a turbine generator according to claim 4 configured to generate electrical power to power the downhole tool, wherein the turbine generator is configured to:
   convert hydraulic power of drilling fluid pumped through the drill string into rotational mechanical power of a rotating shaft;
   maintain a speed of the rotating shaft within a range of acceptable speeds despite changes in a flow rate of the drilling fluid, wherein the speed of the rotating shaft is maintained by causing a fluid medium other than the drilling fluid to shear and produce a countervailing torque on the rotating shaft that is higher when the speed of the rotating shaft is higher and that is lower when the speed of the rotating shaft is lower; and
   convert the rotational mechanical power of the rotating shaft into the electrical power.

15. The drill string of claim 14, wherein the turbine generator comprises a housing, within which is wholly contained a rotor speed governor that is configured to maintain the speed of the rotating shaft within a range of acceptable speeds.

16. A method for drilling a borehole comprising:
   pumping drilling fluid into a drill string, thereby supplying hydraulic power to a turbine generator of the drill string, wherein the turbine generator is according to claim 1, wherein the speed governor wholly internal to the turbine generator is configured to cause the turbine generator to generate electrical power within a range of acceptable output voltages despite changes in drilling fluid flow rate;
   operating a downhole tool of the drill string using the electrical power generated by the turbine generator of the drill string.

* * * * *